United States Patent
Tanabe et al.

(10) Patent No.: US 6,787,174 B2
(45) Date of Patent: Sep. 7, 2004

(54) METHOD FOR MANUFACTURING SAUTÉED ONION OR SOFRIT IN A ROTARY SAUTÉING MACHINE

(75) Inventors: Makoto Tanabe, Kawasaki (JP); Eri Hoshikawa, Kawasaki (JP); Tomoyuki Hirota, Kawasaki (JP); Morihiro Sada, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 407 days.

(21) Appl. No.: 09/880,065

(22) Filed: Jun. 14, 2001

(65) Prior Publication Data

US 2002/0039614 A1 Apr. 4, 2002

(30) Foreign Application Priority Data

Jun. 20, 2000 (JP) ........................................ 2000-184088

(51) Int. Cl.$^7$ ................................................. A23L 1/01
(52) U.S. Cl. ........................ 426/441; 426/519; 426/523
(58) Field of Search ................................ 426/518, 519, 426/438, 441, 520, 523; 99/348

(56) References Cited

U.S. PATENT DOCUMENTS 4,001,451 A * 1/1977 Veeneman et al. .......... 426/438
5,609,902 A * 3/1997 Inakuma et al. ............ 426/466

* cited by examiner

*Primary Examiner*—George C. Yeung
(74) *Attorney, Agent, or Firm*—Oblon, Spivak, McClelland, Maier & Neustadt, P.C.

(57) ABSTRACT

The present invention relates to a method for manufacturing sautéed onion or sofrit. The method includes the steps of sautéing onion or sofrit ingredients in a rotary sautéing machine, and heating the machine with an auxiliary heater concurrently with the sautéing step, whereby the temperature at a center of the onion or sofrit ingredients in a rotary pot of the rotary sautéing machine is increased to 85–950° C. within 10 minutes; and after the temperature at the center of the onion or sofrit ingredients reaches 95° C., deglazing is continuously carried out by spraying water, as required, while maintaining the surface temperature of the onion or sofrit ingredients at 95–120° C. for 15 to 120 minutes, thereby effecting sautéing processing. The method also includes the step of oscillating the rotary sautéing machine concurrently with the sautéing step. According to the present invention, it is possible to easily manufacture sautéed onion and sofrit which has a less pungent taste, is superior in the sweet taste and the caramel flavor and in the shape retention property, and can greatly improve the flavor of hamburger, soup, pasta sauce and the like.

6 Claims, 5 Drawing Sheets

METHOD FOR MANUFACTURING SAUTÉED ONION OR SOFRIT IN A ROTARY SAUTÉING MACHINE

BACKGROUND OF THE INVENTION

1. Technical Field of the Invention

The present invention relates to the manufacture of sautéed onion to be used as a raw material in cooking of, e.g., a hamburger, a croquette, soup or stew, and sofrit to be used as a raw material for a pasta sauce or the like (sofrit meaning, as exemplified by a sautéed food of a herb vegetable such as carrot, onion, celery, or the like, a sautéed food of vegetable containing onion insofar as the present invention is concerned). More particularly, the present invention relates to the manufacture of sautéed onion and sofrit which are superior in, inter alia, sweet taste and caramel flavor, have a good shape-retention property (i.e., a good shape-retainability), and can greatly improve the flavor of such food products as mentioned above. More particularly, the present invention relates to a sautéing machine (rotary sautéing machine) suitable for manufacture of the sautéed onion or the sofrit, a method for manufacturing the sautéed onion or the sofrit, and food products obtained by using the sautéed onion or the sofrit and having an excellent flavor quality.

2. Prior Art

As a method for manufacturing sautéed onion, there has been known, for example, "Method for Manufacturing Sautéed Onion and Food Products" disclosed in (1) Japanese Patent Application Laid-open No. 14352/2000.

And, in connection with this method (invention), it is described that "an object of the present invention is to provide a method for manufacturing sautéed onion which is excellent in sweet taste (i.e., sweetness), can suppress generation of a bitter taste (i.e., bitterness), an acrid taste (i.e., acridity) or an astringent taste, and can improve the flavor of curry or the like. Another object of the present invention is to provide a food product having a high flavor quality with the use of such sautéed onion" based on the recognition of the prior art that "it is known that sautéed onion is, in general, used as a vegetable basic ingredient when making curry or the like, whereby a spicy flavor is given to the resultant curry or the like. However, when onion is sautéed as a vegetable basic ingredient and, in particular on a commercial scale, there easily occurs the problem that the bitterness, the acridity or the astringent taste is produced in a final product, resulting from using cut raw onion." And "the present invention is based on such findings that onion can be brought into contact with the heat transfer surface of a sautéing machine without being piled up, whereby the temperature is increased in a short time, when the onion has been cut in such way that the resultant cut pieces have a specific volume and a flat-type pot is used as the sautéing machine, and furthermore, in this case, sautéed onion which is strong in sweetness and can suppress the bitterness and the like, can be manufactured, if the sautéing treatment is performed under the specific temperature and time conditions" (paragraphs 0002 to 0004 of the "Detailed Description of the Invention" section in the above patent document).

"That is, the present invention is to provide a method for manufacturing sautéed onion by sautéing cut onion with the use of a sautéing machine, which method comprises the steps of: (a) cutting raw onion to such size that the resultant cut pieces have a volume of 0.02 to 8 cm$^3$; (b) using a flat-type pot as the sautéing machine; (c) putting the onion immediately after cut into the sautéing machine, followed by increasing the temperature of the mass put within the sautéing machine to 90° C. within 35 minutes, by the said 90° C. being meant the 90° C. when causing the temperature of the mass to reach the temperature described in the following (d) as being required for sautéing treatment of the onion after put into the sautéing machine; and (d) performing the sautéing treatment at a mass temperature of 90 to 102° C. for 10 to 120 minutes. Furthermore, the present invention also provides a food product which has been produced by using the sautéed onion obtained by the above-mentioned manufacturing method" (paragraph 0005 thereof).

As has been described above, one of the essential characteristics of this method lies in the use of a flat-type pot as the sautéing machine, and in connection with the reasons for using the flat-type pot is described that "the cut onion is then sautéed with a sautéing machine. As the sautéing machine, a flat-type pot is used (one of the indispensable constituent features of the invention (b)). A shape of the flat-type pot is constituted by a bottom wall and side walls erected therearound substantially vertically, and in particular, a shape having a flat bottom wall or a fallen bottom wall and also having, for example, a flat central portion and a curved surface therearound or a curved surface on the entire surface is desirable. The heat transfer area of a flat-type pot (usually, the area of the bottom wall) is preferably 0.1 to 1.2 m$^2$, and the cubic capacity (i.e., the volume) thereof is preferably approximately 0.01 to 0.5 m$^3$. Using a flat-type pot having a wide heat transfer area can assuredly attain the temperature-elevating conditions of the sautéing processing of the later-described indispensable constituent feature (c). As the heat source for a flat-type pot is preferred a heat source which is of an electric type, an electromagnetic induction type, a direct heating type using the combustion of gas, a steam type provided with a jacket, or the like. Furthermore, a flat-type pot having an agitation function is preferable" (paragraph 0007 thereof), and in Example 1 thereof was used a flat-type pot of a direct heating type and having agitation function in consistency therewith.

And, as to the application of the sautéed onion manufactured in the above manner, there is the description that "the sautéed onion manufactured by the method according to the present invention can be used for various kinds of Western-style boiled foods such as curry, hashed meat, stew and others or used for roux for cooking these foods (This may be a solid state, a liquid state or a paste state, or it may be diluted with water to be used for boiling or may be used for boiling without being diluted). It can be extensively used for various kinds of foods such as a variety of sauces, hamburgers or the like. In particular, in case of Western-style boiled foods or sauces, the use of the sautéed onion according to the present invention preferably provide a food with the high quality having a body taste or a mellow taste. The sautéed onion is also useful as a material ingredient on the commercial scale" (paragraph 0012 thereof).

As is apparent from the above description, the aimed-at sautéed onion disclosed in the above-mentioned patent document (1) has no shape retention property or no shape retainability and, in consistency therewith, it is described that "it is desirable that the sautéing processing is carried out in such a manner that the yield of the sautéed onion would be 25 to 75%. The sautéed onion may be cracked or finely crushed with a commit roll or a colloid mill" (paragraph 0011 thereof).

As a method for manufacturing sautéed onion, there has been also known "Method for Manufacturing Sautéed Onion" disclosed in (2) Japanese Patent Application Laid-open No. 23633/2000.

This method (the invention) was achieved with the object similar to that of the method disclosed in the above-mentioned Japanese patent document (1), and on the basis of the recognition of the similar prior art as that described in the same Japanese patent document (1), and it is described in the Japanese patent document (2) that "the present invention is based on the findings that the above-described problem can be solved by cutting peeled raw onion into a predetermined shape, and effecting processing the cut onion under certain conditions followed by performing sautéing processing. That is, the present invention provides a method for manufacturing sautéed onion comprising the steps of: cutting peeled raw onion into a predetermined shape; bringing the cut onion in contact with 50 to 100 parts by weight of hot water per 100 parts by weight of the cut onion; and sautéing the resulting onion in the presence of 3 to 20 parts by weight of an edible oil at a mass temperature of 90 to 102° C. for 70 to 170 minutes. Furthermore, the present invention provides also a method for manufacturing sautéed onion comprising the steps of: cutting peeled raw onion into a predetermined shape; immersing the cut onion in an edible oil having a temperature of 120 to 200° C.; and throwing oil from the onion; followed by sautéing the resulting onion at a mass temperature of 90 to 102° C. for 30 to 140 minutes" (paragraph 0004 of the "Detailed Description of the Invention" section of the above patent document).

To sum up, this method is characterized in that the peeled onion is first cut and "the cut pieces of onion are then (1) brought into contact with hot water and subjected to sautéing processing in the presence of an edible oil, or (2) subjected to immersing processing in an edible oil and thereafter to sautéing processing" (paragraph 0005 thereof).

Moreover, as to a sautéing machine, "it is preferable to carry out the sautéing processing in such manner that the yield of the sautéed onion would be 25 to 70%. It is desirable to perform sautéing with the use of a heating pot having an agitator, for example, a direct heating flat-type pot having an agitator" (paragraph 0007 thereof) and, in consistency with this, the direct heating flat-type pot having an agitator is used in all the examples.

And, as to the uses of the sautéed onion manufactured in the above-mentioned manner, there is the description that "it is an object of the present invention to provide a method for manufacturing sautéed onion which can give an aromatic flavor to a product such as curry roux or the like and suppress an acrid taste or a bitter taste" (paragraph 0003 thereof) and that "according to the present invention, "a product such as curry roux or the like" includes roux for curry, stew, hashed rice or the like (This may be a solid state, a liquid state or a gel state, or may be diluted with water to be used, or may be used without being diluted with water)" (paragraph 0005 thereof).

As is apparent from the above description, the aimed-at sautéed onion disclosed in the above-mentioned patent document (2), does not have a shape retention property.

On the other hand, as a sautéing machine, there has been conventionally known a so-called rotary pot as compared with a flat-type pot.

As such a rotary pot, for example, there may be mentioned "Sautéing Machine" disclosed in (3) Japanese Utility Model Application Laid-open No. 83323/1987. This sautéing machine has such structure that steam is not close therein. Specifically, a hot air blowing port is provided to the bottom of a rotary drum to cause the steam in the pot to escape therefrom, thereby improving the performance of the sautéing machine.

Additionally, in regard to a method of sautéing with the use of a rotary pot, there is known, e.g., "Sauté-Cooking Method Using No Oil" disclosed in (4) Japanese Patent Application Laid-open No. 146760/1988.

This method (the invention) relates to a method for sautéing foods such as onion or other vegetables, fruits or the like without using oil, namely, non-oil sautéing. And, the problems to be solved by the invention lies in that "since the conventional sauté-cooking with the use of oil provides an oil film protecting the material to be cooked, this cooking is very effective, but loses the moisture contained within the material to be cooked. Of course, this method can not be applied to foods which can not be adapted to fat. Further, the smell of an oil and fat content may disserve the original taste of a food and, on the other hand, the oil and fat content added to the food is oxidized by heating, whereby a peroxide value (POV) is increased which, in turn, leads to degeneration change in quality of a food. This is an obstacle for a long term preservation" (the "(c) Problems to be Solved by the Invention" column of the "Detailed Description of the Invention" section of the above patent document), and in order to solve this problem, "the present invention provides a third heat-cooking means in addition to boiling and toasting, which can eliminate oils from the sauté-cooking which has been considered as inseparable from oils and prevents oxidation by using only water. According to this means, moisture or water (or a solution including no oil and fat content, such as lecithin, fruit wine, alcohol or the like may be used instead) is supplied to and spread on an iron plate immediately before the object to be cooked is brought into contact with the iron plate which has been heated above a burning temperature, and the material to be cooked is moved and passed on the moisture film, whereby heat-cooking is effected" (the (d) Means for solving the Problems" column of the above patent document).

That is, this method (the invention) relates to "(1) a sauté-cooking method using no oil, wherein moisture or water is supplied to and spread on the surface of an iron plate to form a moisture film immediately before the object to be cooked is brought into contact with the iron plate which has been heated beyond a burning temperature, and the material to be cooked is slidingly passed on the moisture film", and when such a sauté-cooking method is carried out by using a rotary pot, this can be "(2) a sauté-cooking method using no oil as set forth in claim (1), wherein an agitator is provided to an inner side wall portion, a cylindrical rotary pot supported slantingly on a heating portion at a slat is rotated, and moisture is supplied to the heated inner wall surface immediately before the material to be cooked, when stirred up by the agitator, falls on the heated inner wall surface" (the "What is claimed is" section).

To sum up, the method disclosed in the patent document (4) is a method for manufacturing stirred sautés which do not have smell of an oil and can not get burned, in connection with the method according to the present invention which will be described later, and it can be said that this method is a rotary sautéing which forms a water film between an iron plate and an object to be heated, which is brought into contact therewith, which can decrease the POV and improve the flavor.

However, the onion obtained by this sauté-cooking method using no oil has a pungent taste and is not preferable as sautéed onion or sofrit.

Another example of a method of sautéing with the use of a rotary pot is "Method for Manufacturing Half-processed Material to be cooked, Foodstuff and Apparatus" disclosed in (5) Japanese Patent Application Laid-open No. 168348/ 1996. This relates to the improvements of the method disclosed in the patent document (4) referred to just above, and to a method for manufacturing a half-processed material to be cooked of onion, wild rocambole, cabbage, fruits, or the like, which half-processed material can be used as cooking basic ingredients for, e.g., a hamburger, a Chinese dumpling with minced pork and vegetable stuffing, a croquette or the like (paragraphs 0001 to 0002 of the "Detailed Description of the Invention" section of the above patent document).

That is, there is described therein the problems that "since a half-processed material to be cooked prepared by using a conventional non-oil sautéing method is subjected to sautéing processing by sliding a cut food material on the film of spread water on the moving heating surface, the mass temperature of the food material is low and therefore, a considerably long time is required by a sautéing film has been formed on the surfaces of the cut food material, during which the moisture (umami) in the food material exudes so that the original good taste of the food material is lost, and the yield at the time of completion of processing is deteriorated. Furthermore, since the mass temperature of the food material is low, whereas the temperature on the moving heating surface is high, a reverse osmotic pressure acts on the food material, and the moisture (umami) in the food material exudes to lose the flavor of the material in an extreme case" (paragraphs 0005 and 0006 of the above patent document), and it is described that "in view of the above-described problems, the present invention is intended to comply therewith in such manner that a food material is heated to such degree that the mass temperature of the food material itself is previously increased to approximately 40 to 80 degrees centigrade when performing non-oil sautéing, and then the food material is cut to a predetermined size followed by being supplied to the moving heating surface while maintained warm. Moreover, by cutting the food material while retaining the heat after preliminary heating, the mass temperature of the material to be processed can be increased in a short time during sautéing processing, and exudation of the umami taste can be prevented during the processing. In addition, deactivation of the enzyme is hastened so that crispness of the fresh material is maintained, meanwhile moisture can sufficiently penetrate in the material, thereby obtaining the sufficient sautéing effect without being scorched and the like" (paragraphs 0007 to 0008 of the above patent document).

That is, this method (the invention) relates to "(claim 1) a method for manufacturing a half-processed material to be cooked, wherein a material of a cooking foodstuff is heated in such degree that the mass temperature of the material itself is increased to 40 to 80 degrees centigrade and slided on the film of spread water on the moving heating surface while retaining heat, whereby sauté-cooking is performed" and, as an apparatus suitable for this method, there is mentioned" (claim 4) an apparatus for manufacturing a half-processed material to be cooked, wherein the material to be cooked is sequentially carried into a rotary pot having an agitator on the heating surface from a heater through a heat retention cutting mechanism". Additionally, in the only example is also used a rotary pot having an agitator and a moisture spraying mechanism.

That is, there is described that "a rotary pot 3 has an agitator 4 on the inner wall surface and swiveled by a rotary shaft 5, whereby a moving heating surface 6 is constituted, and a food material A subjected to cutting is supplied from the cutting mechanism 2 to this heating surface 6. When the cut food material A is supplied onto the moving heating surface 6, the material A moves by its own weight in a direction opposed to the moving direction of the heating surface 6 and is stirred up by the agitator 4. However, when the agitator 4 moves up beyond the support angle, the material A again falls on the heating surface 6. The material A is stirred up by the agitator 4, and moisture heated above 80 degrees centigrade is sprayed and supplied onto the part of the heating surface 6 on which part the material A does not exist, immediately before falling of the material A. The moisture is boiled and spread, whereby a film of the spread water W is formed between the falling material A and the heating surface 6. The food material A slides on the heating surface 6 without getting scorched by the film of spread water W and is again stirred up by the agitator 4. The spraying and supplying the moisture and the falling are repeated, during which deactivation of the enzyme in the food material and the sauté-cooking are carried out in that period of time" (paragraphs 0016 to 0019 of the above patent document), and that "since the present invention has the above-described constitution, it is possible to assure such yield that the weight % of the food material is approximately 100% even after cooking, and improve the heat efficiency. Additionally, the process time can be shortened, which is useful for reduction in the production cost. Further, since the umami flavor or the moisture of the food material does not exudes but absorbed by the action of the osmotic pressure due to the mass temperature, it is possible to manufacture a half-processed material to be cooked maintaining the taste components or the flavor of the food material and crispness of the fresh material" (paragraphs 0022 to 0023 of the above patent document).

However, the half-processed onion obtained by the half-processed material to be cooked manufacturing method disclosed in the patent document (5) has also the pungent taste and is not preferable as sautéed onion or sofrit.

To sum up the prior art concerning the present invention, it is known that sautéed onion or sofrit is, in general, used as potherbs when making a hamburger, soup, a pasta sauce and others, which can add a sweet taste and an aromatic taste to the hamburger, the soup, the pasta sauce and others. However, when sautéing onion or a material for sofrit as the potherbs, in the sauté-processing on the commercial scale in particular, problems are apt to occur that the pungent taste and the acrid taste remain in a final product, and the like, in sautéing with the use of a conventional rotary pot, and that the shape retention property can not be provided, the yield is the same as that of a stir-sauté obtained by using a rotary pot, the sweet taste and the caramel flavor are both decreased, and the like, by sautéing with the use of a flat-type pot.

SUMMARY OF THE INVENTION

[Problems to be Solved by the Invention]

In the background of the prior art described above, it is an object of the present invention to provide a method for manufacturing sautéed onion or sofrit which has a less pungent taste and a less acrid taste, is superior in the sweet taste and the caramel flavor and in the shape retention property, and can accordingly improve the flavor of hamburger, soup, pasta sauce and the like. Further, it is another object of the present invention to provide food products excellent in flavor quality using the thus manufactured sautéed onion or sofrit.

[Means to Solve the Problems]

As a result of their dedicated studies to achieve the above-mentioned objects, the present inventors have found, as regards sautéing onion or materials for sofrit, that a rotary sautéing machine, preferably a rotary sautéing machine equipped with an agitation blade having a specific shape is used as the sautéing machine; and concurrently therewith, an auxiliary heater such as overheated steam, steam, hot air or the like is used and/or oscillation is carried out, whereby the materials can be uniformly heated and increased in temperature in a short time, as chefs do using a frying pan (rapid rising of the initial mass temperature), and that sauted onion or sofrit which has a less pungent taste and a less acrid taste, is excellent in sweet taste and caramel flavor, and has a good shape retention property, can be manufactured by preventing burning by deglazing with the use of water spray, if required, in performing the subsequent sautéing processing. On the basis of these findings, the present inventors have completed the present invention.

Accordingly, the present invention relates to a rotary sautéing machine, wherein the cross-sectional shape of the surface in the rotating direction of a blade provided in the pot is such that, in a cross section vertical to the rotary shaft of the pot, assuming that a straight line running from an attachment point of the blade onto the cylindrical surface toward the center of the rotary shaft is an x coordinate axis, the attachment point is x=0 (the origin), and the position of the foot on the x axis of a perpendicular line extending downwards from an end of the blade is x=1, and when the height y of the cross-sectional line of the blade is expressed by a function of x, f(x), the x coordinate at which a value of the derived function of y=f(x) becomes 0 is not less than 0.4, and at the same time, the absolute value of the definite integral of the derived function between the position where the value of the derived function becomes 0 and x=1 is not more than 40% of the absolute value of the definite integral of the derived function until the derived function becomes 0 from x=0. Further, the present invention relates to a method for manufacturing sauted onion or sofrit, wherein a rotary sautéing machine is used as the sautéing machine when sautéing cut onion or materials for sofrit; and concurrently therewith, an auxiliary heater such as overheated steam, steam, hot air or the like is used and/or the rotary sautéing machine is oscillated, whereby the temperature at the center of a material piece in the rotary pot is increased to 85–95° C. within 10 minutes; and after the temperature at the center of the material piece reaches 95° C., deglazing is continuously carried out by spraying water, as required, while maintaining the surface temperature of the material piece at 95–120° C. for 15 to 120 minutes, thereby effecting sautéing processing. Furthermore, the present invention relates to food products with a high flavor quality using therein sauted onion or sofrit obtained by the above-described manufacturing method.

Figure 1:
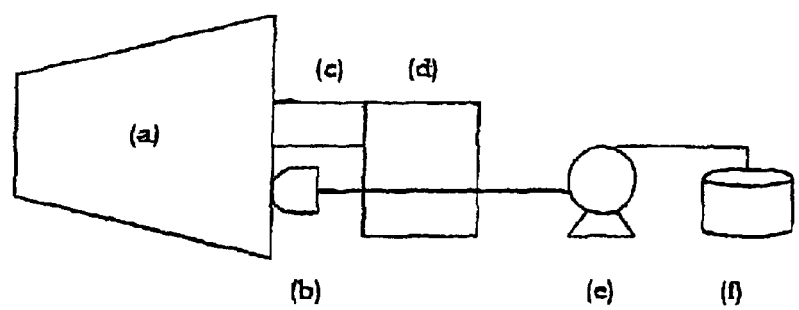
FIG. 1 conceptually shows an example of the rotary sautéing apparatus which can be used for carrying out the manufacturing method according to the present invention.

DESCRIPTION OF THE REFERENCE NUMERALS (a) rotary pot
(b) spray nozzle
(c) hot air (overheated steam, steam) duct
(d) hot air (overheated steam, steam) generator
(e) pump
(f) tank

DETAILED DESCRIPTION OF THE INVENTION

The present invention will now be described below in detail successively.

First, description will be given as to a rotary sautéing machine suitable for manufacture of sautéed onion or sofrit according to the present invention.

The shape of an agitation blade provided inside the rotary sautéing machine is important not only for appropriately agitating the onion but also for preventing the onion from being adhered onto the blade and the inner surface of the pot. In general, an agitation blade agitates material to be sautéed, as the pot rotates, by scooping up the material, and then lifting up the material, whereby the material to be sautéed is then caused to drop down from the blade, within the pot. Thus, if the shape of the blade is inappropriate, when sautéing onion in particular, the onion is attached and stays on the attachment position of the agitation blade and the inner surface of the pot in the vicinity thereof, and the burnt deposit is generated during sautéing, thereby largely degrading the quality of the sautéed onion.

For a rotary sautéing machine to be used for sautéing onion, the cross-sectional shape of the surface in the rotating direction of the agitation blade is important. As a result of testing the adhering and behind-staying property of onion with the use of a rotary sautéing machine equipped with an agitation blade, with the cross-sectional shape thereof being changed, the present inventors have found that there are characteristics which should be provided to the cross-sectional shape of the blade.

The structure of a rotary sautéing machine according to the present invention will now be described hereinafter with reference to the drawings.

FIG. 1 shows an appearance of the sautéing apparatus of a rotary pot according to the present invention wherein a rotary sautéing machine is used (conceptual view). In this apparatus, a spray nozzle (b) sprays water to the pot bottom portion to perform deglazing (scraping off caramel material resulting from the ingredient material for sofrit). Further, the duct (c) of a hot air (overheated steam or steam) generator is provided at the position where the ingredient material for sofrit lifted up by the agitation blade drops down.

Figure 2:
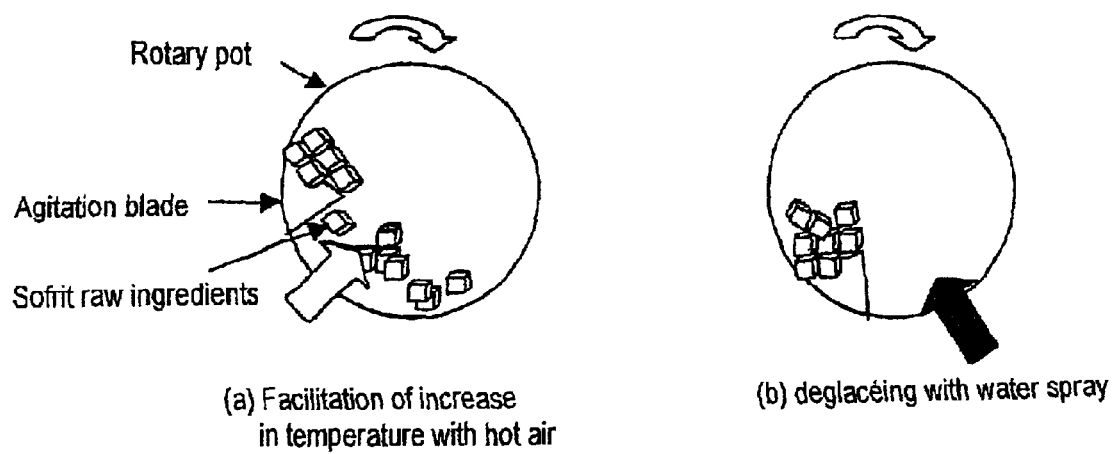
FIG. 2(a) typically shows an example of facilitation of increase in temperature by using hot air, and FIG. 2(b) typically shows an example of deglazing by water spray.

FIG. 2 shows temperature-elevating facilitation with hot air (a) and deglazing by spraying water (b), taking, as an example, a case where the number of agitation blades is one (conceptual view). In the temperature-elevating facilitation with hot air, an auxiliary heating source such as hot air, overheated steam, steam or the like, is blown to positions where the basic ingredient drops down. Moreover, in the deglazing with water spray, water is sprayed at positions where the material to be sauted such as onion is scraped off.

Figure 3:
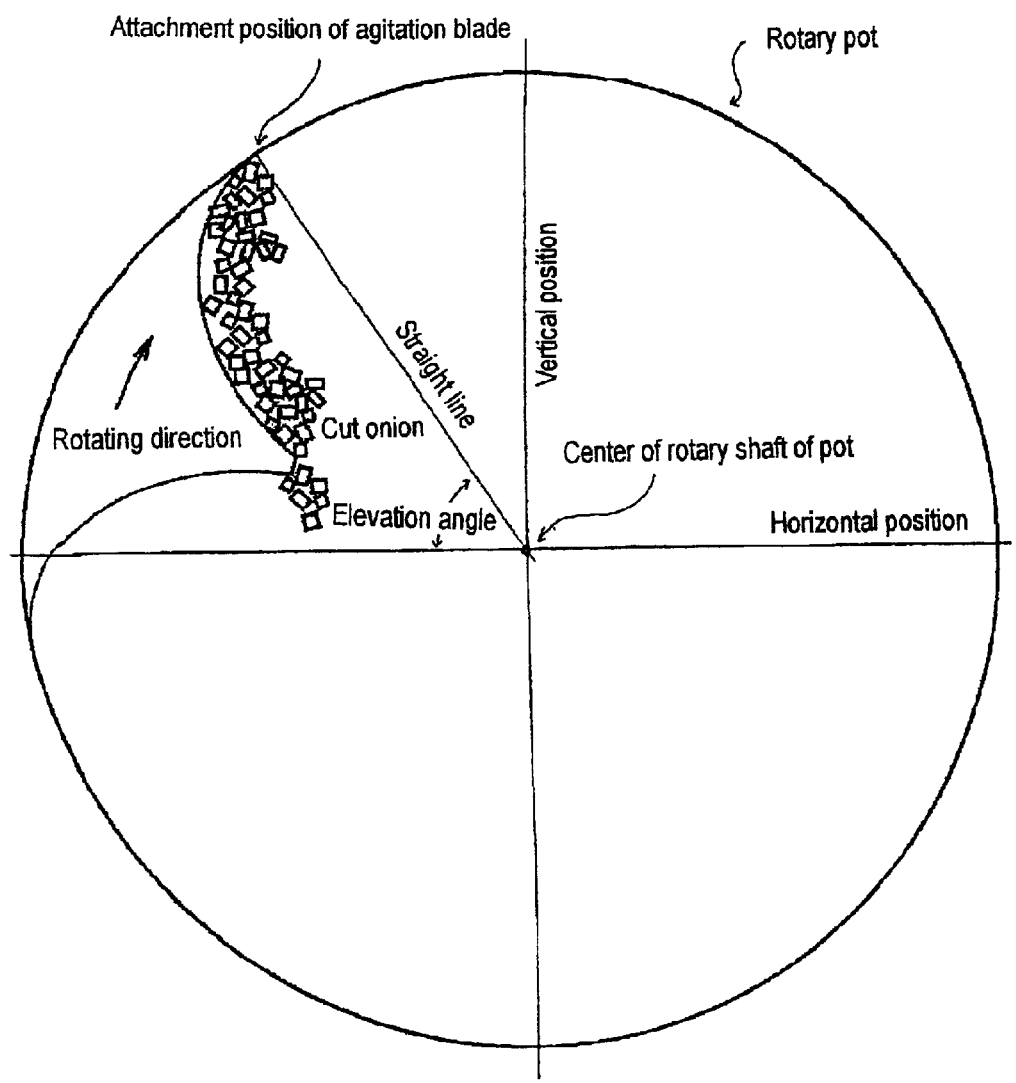
FIG. 3 shows a cross section of an example of a rotary pot in the rotary sautéing machine according to the present invention.
Figure 4:
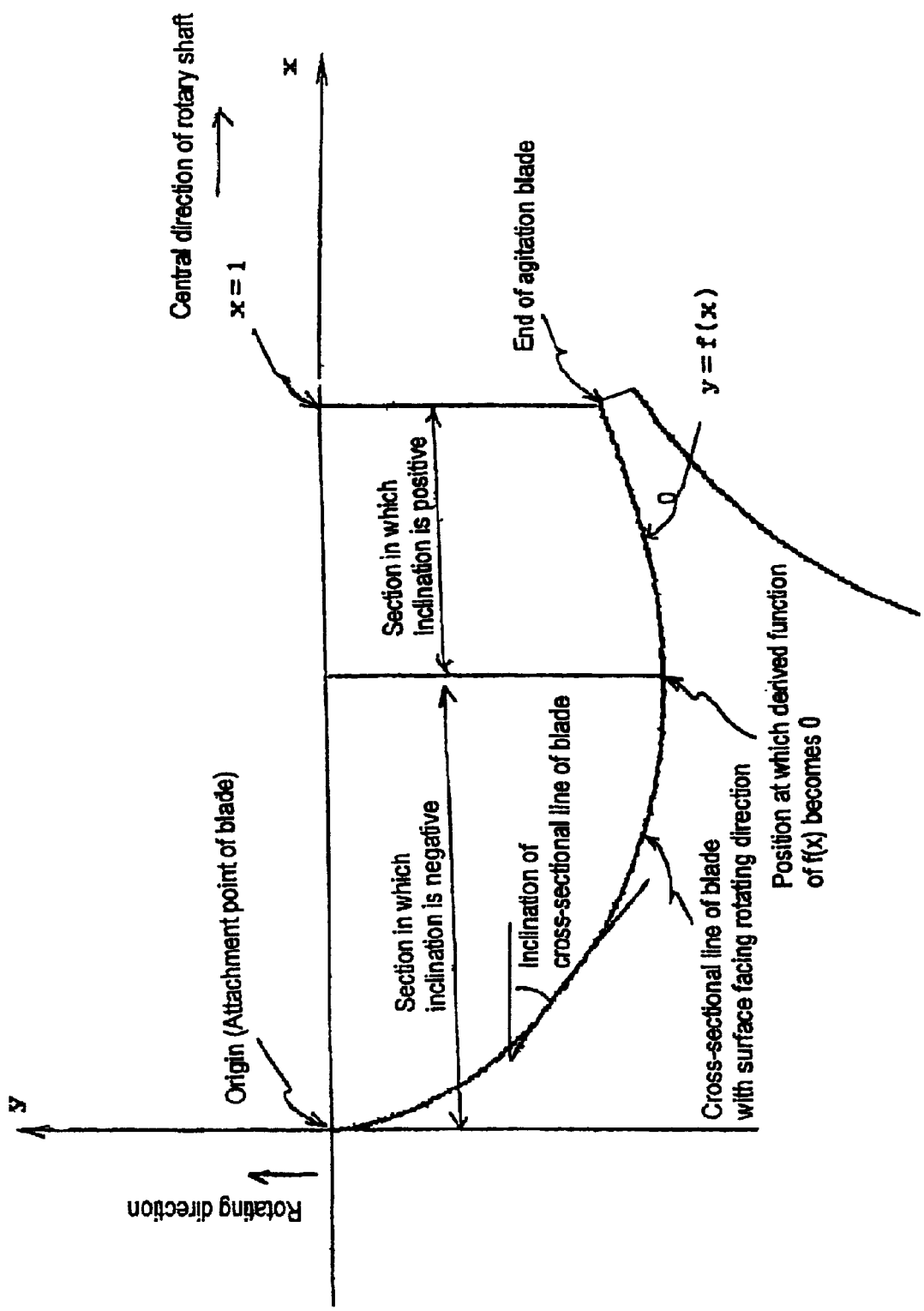
FIG. 4 is a partially enlarged view of the cross section of the example of the rotary pot in the rotary sautéing machine according to the present invention.

FIG. 3 shows a cross-sectional view of the rotary pot having one agitation blade which accommodates therein onion pieces as the material to be sautéed and is currently rotating, and FIG. 4 shows an enlarged view showing the vicinity of the agitation blade. These Figures are to help understand the appropriate blade shape which will be subsequently explained, and the terms used in the explanation are given in these Figures.

In greater details, the onion (onion cut to pieces) scraped off by a agitation blade is stirred up, while being put on the agitation blade in the vicinity of the attachment position. The stirred-up onion needs to slide down on the surface of the agitation blade and fall while the straight line connecting the attachment point of the blade and the center of the rotating shaft of the pot changes from the horizontal state to the vertical state, or preferably in a range of 60 to 70°. That is because, if the onion pieces do not slide down even though the elevation angle of the straight line becomes vertical or substantially vertical, the onion pieces do not slide on the agitation blade but tumble down when the elevation angle reaches this state, and a part of the onion pieces is hence attached and remains in the vicinity of the root portion of the agitation blade.

A lump of the onion pieces scooped up by the agitation blade slides down on the surface of the agitation blade and falls as the lump when the elevation angle reaches an appropriate state (angle). Therefore, elimination of the onion pieces which are attached and remain on the blade and the surface of the pot is determined depending upon change in the inclination of the agitation surface of the agitation blade, namely, the surface facing the rotating direction.

Here, as to the cross-sectional shape of the agitation surface, assuming that the attachment point of the agitation blade on the cylindrical inner surface of the pot is the starting point (the origin), a straight line extending from the starting point to the center of rotation of the rotary pot is the x axis and the rotating direction side of the straight line orthogonal to the x axis at the starting point is the y axis, the height of the cross-sectional line of the agitation blade relative to each x coordinate can be expressed by the y coordinate. As a result, the shape of the cross-sectional line of the agitation blade can be expressed in the form of $y=f(x)$ as the height (y) relative to the x coordinate. Further, the scale of these coordinate axes is expressed by a relative value when the radius of the rotary pot is determined as 1.

The negative inclination relative to the above-described straight line at the attachment point of the agitation blade gives force for enabling a lump of the onion pieces to be stirred up and piled up in the vicinity of the root portion of the agitation blade to slide down on the surface of the agitation blade when reaching the above-mentioned angle. On the other hand, the positive inclination in the vicinity of the end of the blade gives force for preventing a lump of the onion pieces from sliding down. Whether a lump of the onion pieces slides down on the agitation blade and drops down when attaining the preferred elevation angle, is determined by the balance of the negative inclination in the vicinity of the root portion of the blade (in the vicinity of the attachment position) and the positive inclination in the vicinity of the end of the blade.

When the preferred elevation angle is obtained for the straight line, in order that a lump of the onion pieces existing at the root portion of the agitation blade may slide down and fall, first, the range in which the inclination of the cross-sectional shape of the blade is negative, must be at least not less than 0.35 of the range of the x axis for the entire blade, preferably not less than 0.4, and more preferably not less than 0.5.

In addition, concerning the relationship between the accelerating force of falling caused due to the negative inclination and the deterrence for falling, the deterrence must be smaller than the accelerating force. In order to cause an excellent falling, the deterrence must be not more than 40% of the accelerating force, or preferably not more than 25%. Here, the accelerating force and the deterrence caused due to the inclination can be compared by using the absolute value of the definite integral of the inclination in the range where the inclination is negative and that in the range where the inclination is positive. That is, the absolute value of the definite integral of the inclination in the section between the point where the inclination is 0 and the end of the blade, must be at least not more than 40%, preferably not more than 25%, of the absolute value of the definite integral of the inclination in the range between the attachment point of the blade and the point where the inclination is 0.

By using a rotary sautéing pot provided with an agitation blade having the above-described cross-sectional shape, the onion pieces scooped up with the agitation blade at the lower portion of the pot at the rotating position are lifted up to the upper portion of the pot as a lump, and the onion pieces gathered at the root portion of the agitation blade slide down and fall from the agitation blade as a lump, with the elevation angle of the straight line connecting the root portion of the agitation blade and the center of the rotating shaft falling within a range of 60 to 70°. As a result, the onion pieces can be prevented from being attached and remaining on the inner surface of the pot in the vicinity of the root portion of the agitation blade and the surface of the agitation blade, whereby degradation of the quality of the sautéed onion caused due to partial burning can be avoided.

Secondly, a method for manufacturing sautéed onion or sofrit according to the present invention will now be described.

In the manufacturing method according to the present invention, skin-peeled onions or basic ingredients of sofrit are first cut. At this time, the cut size can be appropriately determined depending on the application of the sautéed onion or sofrit. For example, onions or materials of sofrit are cut in such manner that the volume of one piece becomes 0.01 to 10 $cm^3$, preferably 0.09 to 1 $cm^3$. The cut shape may be any of a dice shape, a slice shape or the like.

Subsequently, the cut onion or the sofrit materials are sautéed with a sautéing machine. As the sautéing machine, a rotary sautéing machine is used. As to the shape of the rotary pot, a cylindrical shape having an agitation blade (agitator) is preferable. Further, as a heat transfer area of the rotary pot, 0.3 to 0.8 $m^2$ is preferable. Moreover, as a volume of the same, approximately 0.5 to 1.2 $m^3$ is preferable. In addition, it is determined that a quantity of heat to be supplied per unit area is 50,000 to 80,000 kcal (h·$m^2$), and an auxiliary heater such as overheated steam (200 to 350° C.), steam (0.05 to 0.4 MPa), hot air (200 to 350° C., 10 to 25 KW, 5 to 15 $m^3$/min) or the like, is concurrently used. As a result, the conditions for rapid increase in the initial mass temperature that the temperature at the center of the contents or the mass in the rotary pot is increased to 85 to 95° C. within 10 minutes, can be assuredly realized. The conventional hot air blowing device has a heat exchange capability (corresponding to 5 KW) of only approximately 80° C. in terms of the temperature at the blast outlet, and the above temperature-elevating conditions can not be realized therewith. As a heat source of the rotary pot, a direct heating type by gas combustion, an electromagnetic induction type, or the like is preferable.

Oscillation can be also utilized, together with or instead of the above-described auxiliary heater. Oscillation described herein means an operation for adding motion for vibrating the pot from side to side within such angle range that the entire material is not stirred up or falls by the agitation blade, with the material to be sautéed being put in the sautéing pot.

Regarding the conventional rotary sautéing machine, an agitation operation called "whipping" from the beginning of sautéing, namely, an operation for causing the rotary pot to go into at least 360-degree roll in the same direction, whereby the material to be sautéed is stirred up in the pot by the agitation blade while the material drops down at the upper portion of the pot, ending in uniform agitation of the entire material, is applied in general.

Accordingly, if such whipping operation is carried out in the initial stage of sautéing, i.e., in a period in which the mass temperature (i.e., the temperature of the mass in the pot) is increased to within a range of 85 to 95° C., a time in which the material is in contact with the heating surface is smaller, and the mass temperature is lowered while the material is stirred up and falls. Therefore, the time required for increasing the mass temperature to within the said range becomes longer, and preferable sautéing results can not be hence obtained. On the contrary, when heating is continued with the rotary pot being completely stopped in the initial stage of sautéing, the material to be sautéed which is in contact with the heating surface stays at the same place on the heating surface, and burning is partially generated, which is not preferable.

At the start of sautéing, it is important to rapidly increase the mass temperature to within a range of 85 to 95° C., and it is therefore preferable to carry out the oscillation operation, instead of the whipping operation which is generally effected. That is because, according to the oscillation operation, the pot is rotated in such manner that it is vibrated from side to side within such degree that stirring-up and falling of the material are not generated by the agitation blade, and the position of the material which is in contact with the heating surface is moved. As the results, the material can be prevented from being attached onto the heating surface, and the time for heating the same surface of the material is prolonged, thereby facilitating increase in temperature of the material. Further, such a movement wherein a part of the material counterchanges, enables slow mixing.

Performing such an oscillation operation rapidly increases the mass temperature without burning the material after starting sautéing, thereby obtaining preferable sautéed results.

The cut onion or sofrit material is rapidly put into (the rotary pot of) the sautéing machine, and heated to the above-described mass temperature (85 to 95° C.) required for sautéing processing. In this case, it is preferable to put the onion or the sofrit material into the sautéing machine in an amount occupying 10 to 30% of the cubic capacity of the sautéing machine. That is because the conditions of rapidly increasing the initial mass temperature for the sautéing processing, can be appropriately met.

The rapid increase in mass or contents temperature at the initial stage is important, which rapid increase means that the mass temperature at the center of the onion or the sofrit material is caused to be elevated to 95° C. within the initial 10 minutes. That is, the meeting of this condition can make it possible to obtain sautéed onion or sofrit which has sulfur-containing compounds in less amounts, such high flavor quality that the sweet taste is superior and the caramel flavor is excellent, and a good shape retention property. When the time required for elevating the temperature to such degree exceeds 20 minutes, the pungent taste or the acrid taste is apt to remain in the onion. It is to be noted that if the mass temperature is caused to be elevated to 95° C. within 5 minutes, the resulting sautéed onion can be of a higher quality.

After rapidly increasing the initial mass temperature, the subsequent sautéing processing is effected by maintaining the surface temperature of material pieces of the material to be sauted such as onion or the like at 95 to 120° C., preferably 98 to 100° C. for 15 to 120 minutes, while rotating the rotary pot. For this end, it is preferable for the purpose of preventing the scorch to carry out this processing by maintaining the inner pot surface temperature of the rotary pot at 160 to 200° C., while deglazing the caramel component emerging on the inner pot surface by spraying water. The sautéing time is determined to be 15 to 120 minutes as mentioned above, and onion or sofrit of a more excellent flavor quality can be obtained by sautéing up the material for preferably 20 to 60 minutes. By this, in combination with the above-described conditions of rapid increase in the initial mass temperature, it is possible to obtain sauted onion or sofrit which has the good sweet taste and the excellent caramel flavor, and maintains the shape retention property.

It is to be noted that the shape retention property means, insofar as the present invention is concerned, the state where the crispness of vegetables remains, not being in the state of a paste.

As an index of the shape retention property, a value of (the volume of the vegetable after being sautéed)/(the volume of the vegetable before being sautéed) is used (in this case, volumes indicate the solid portions resulting from centrifuging the vegetables with the use of a centrifugal force of 4,500 g for 10 minutes), and if vegetables after sautéed have a value equal to or higher than a given value (reference value) is defined as having the shape retention property.

Further, in the case of sautéed onion, the reference value is 0.45, and the above-mentioned value of the sautéed onion obtained by the manufacturing method according to the present invention (the later-described Example 2) was 0.50, whereas the value of the same obtained according to the prior art method (the Example 1 disclosed in Japanese Patent Application Laid-open No. 14352/2000) was 0.41 (this comparison being made when the yields were 50%, respectively). From these results, it was also confirmed that the sautéed onion obtained by the manufacturing method according to the present invention is superior in the shape retention property.

Furthermore, in the case of sofrit, the reference value is 0.50, and the sofrit made according to the present invention in conformity with the same Example as that in the case of the onion had a value of 0.60 to 0.64, whereas the sofrit made according to the prior art method in conformity with the same Example as that of the onion gave a value of 0.45. From these results, it can be also understood that the sofrit according to the present invention is superior in the shape retention property.

Incidentally, it is needless to say that the sautéing processing can be performed with various kinds of fats and oils such as a salad oil, an olive oil, and the like, seasonings, and others being added. Fats and oils are preferably added in an amount of 0 to 20 parts by weight, preferably 3 to 10 parts by weight per 100 parts by weight of the starting raw material vegetable, for the reasons of suppression of exudation of moisture (flavor) from the starting raw material vegetable, and prevention of scorch during heating and of decrease in the mass temperature. It is preferable to carry out the sautéing processing in such manner that the vegetable weight of the sautéed onion or the sofrit after sautéed becomes 25 to 80% of the starting raw material vegetable weight before being sautéed.

The sautéed onion and sofrit manufactured by the method according to the present invention can be widely used in various kinds of foods. The sautéed onion can be used as a basic ingredient of Western-style foods and the like such as a hamburger, a croquette, soup, stew, or the like, and the sofrit can be used as a basic ingredient of pasta sauces, boiled foods, or the like. In particular, in the case of a sauce, soup, a hamburger, and the like, foods of high quality having a definite rich and thick taste can be obtained by using the sautéed onion or sofrit according to the present invention, which is preferable.

Further, it is needless to say that the sautéed onion and sofrit manufactured by the method according to the present invention can be devoted for his own consumption by the manufacturer, and they can be distributed as frozen products or in the chilled state.

Although the above is the description of the embodiments of the present invention, the inventions disclosed in the patent documents cited above and the present invention are compared for better understanding of the present invention, as follows.

That is, firstly, onion is sautéed with a flat-type pot according to the invention disclosed in (1) Japanese Patent Application Laid-open No. 14352/2000, and the onion crushed or ground by using a flat-type pot has no shape retention property, whereas onion is sautéed up by using a rotary pot according to the present invention, and the sautéed onion has the shape retention property. Secondly, onion is sautéed by using a flat-type pot according to the invention disclosed in (2) Japanese Patent Application Laid-open No. 23633/2000, and the sautéed onion has similarly no shape retention property. Furthermore, according to this invention is provided a method for performing the initial heating by bringing 100 parts by weight of onion into contact with 50 to 100 parts by weight of hot water. On the other hand, the present invention provides a method where hot air or overheated steam is used as auxiliary means for increasing the temperature, and the method is characterized in that the temperature can be increased without supplying unnecessary water to the onion, as compared with the method using hot water. Moreover, the device disclosed in (3) Japanese Utility Model Application Laid-open No. 83323/1987 has indeed a mechanism for blowing hot air by providing a hot air blowing port to the bottom of the rotary drum, but its purpose is to let the steam stuffed in the pot out, and the effect for positively heating the material to be sautéed such as onion by using hot air is not expected. In addition, the invention disclosed in (4) Japanese Patent Application Laid-open No. 146760/1986 relates to a method for manufacturing sautéed onion without getting burned and without using a sautéing oil by forming a water film between the heating surface and the object to be heated. However, the sautéed onion obtained by this method still have the pungent taste and are not preferable as the sautéed onion or sofrit to be used as an ingredient material for a hamburger or the like. On the other hand, the sautéed onion obtained according to the method of the present invention can bring out the sweet taste while eliminating the pungent taste, and therefore, the method can make it possible to obtain sautéed onion suitable as an ingredient material of a hamburger or sofrit. Lastly, the invention disclosed in (5) Japanese Patent Application Laid-open No. 168348/1996 also relates to a method for manufacturing sautéed onion without getting burned with a water film without using a sautéing oil, like the invention disclosed in Japanese Patent Application Laid-open No. 146760/1988, and the method is characterized in that the material to be sautéed is previously heated to 80° C. and then chopped. However, the sautéed onion obtained by this method likewise still have the pungent taste and is not preferable as the sautéed onion or sofrit aimed-at by the present invention.

EXAMPLES

The present invention will now be described hereinafter in detail, with reference to an Experimental Example and Examples.

Experimental Example 1

Figure 5:
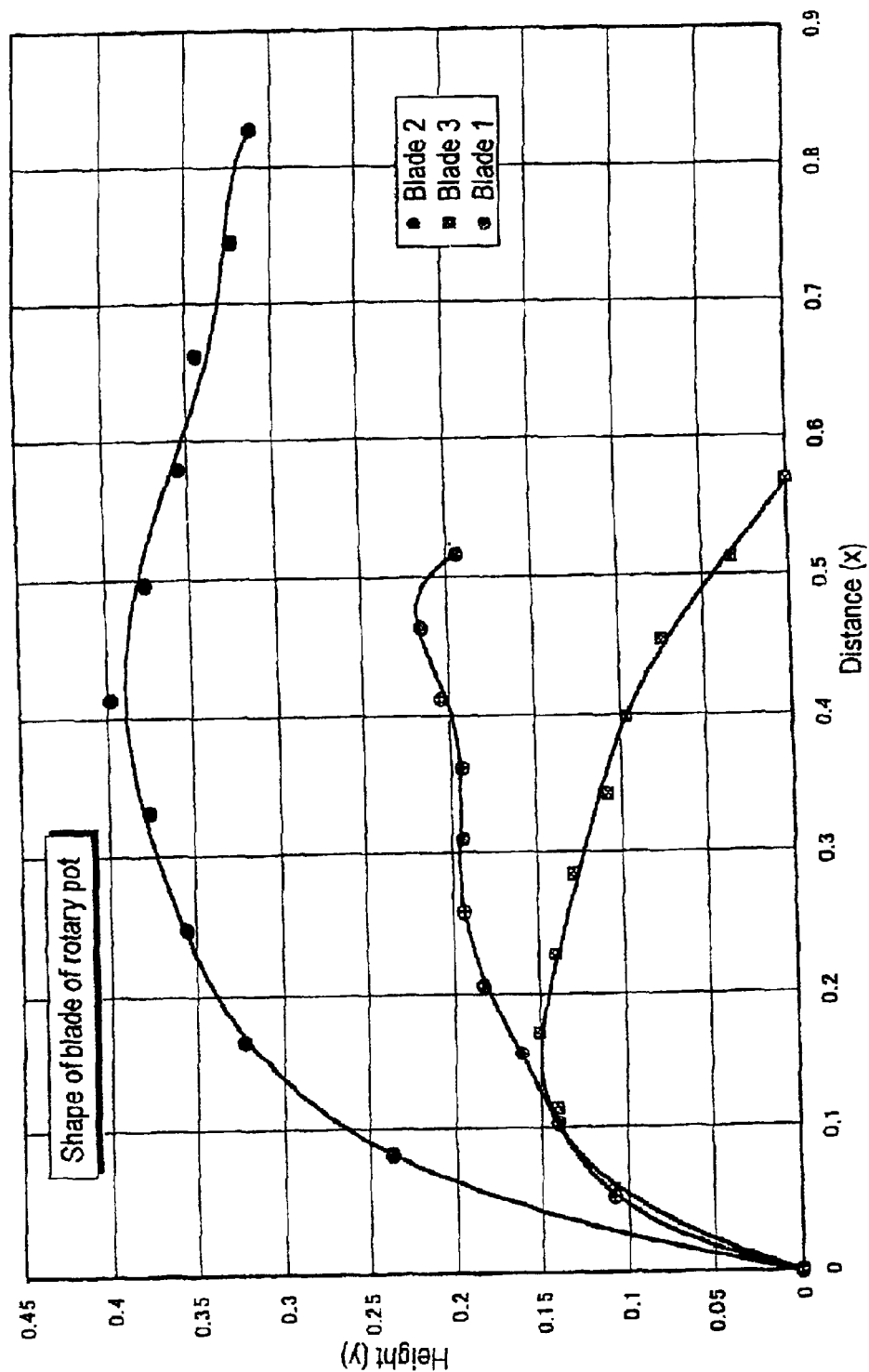
FIG. 5 shows shapes of agitation blades of the example of the rotary pot in the rotary sautéing machine according to the present invention (three types, Test Example 1).
Figure 6:
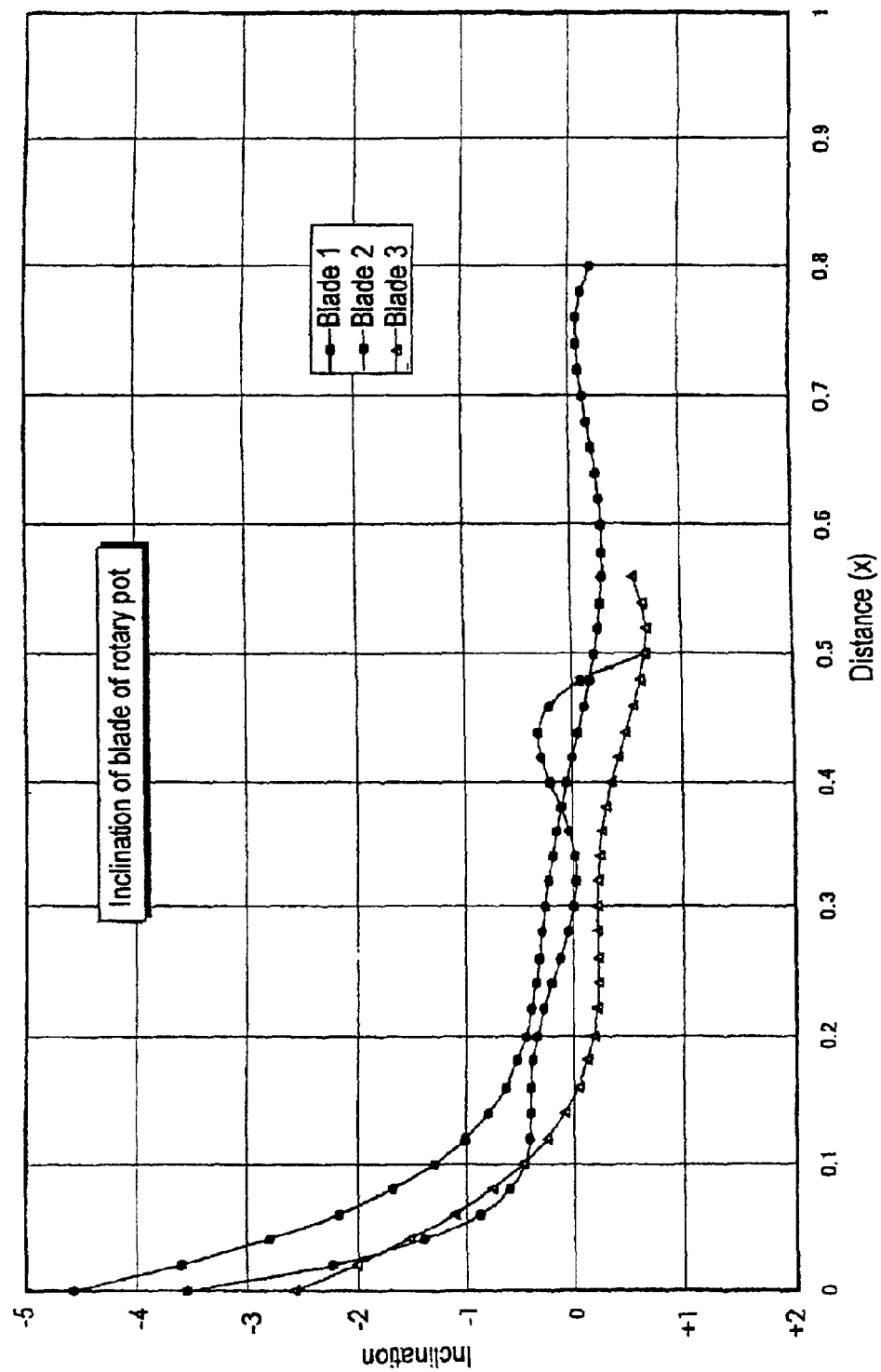
FIG. 6 shows inclinations of agitation blades of the example of the rotary pot in the rotary sautéing machine according to the present invention (three types, Test Example 1).

With the use of sautéing machines having three different types of rotary pots where the shapes and inclinations of agitation blades are different, the shapes and the inclinations being shown in FIGS. 5 and 6, onion was sautéed in the same manner as in the later-described Example 1. Blade 1 has a shape where the length is 0.52 with respect of a radius of 1 of the pot, and the inclination is negative in the section of up to 0.31, and substantially 0 in the section of therefrom to the end, and at the same time, a shape where the absolute value of the definite integral of the inclination in the section of the positive inclination is 10% of that in the section of the negative inclination. Moreover, Blade 2 has a shape where the length is 0.83, and the inclination is negative in the section of up to 0.41, and at the same time, a shape where a ratio of the absolute value of the definite integral of the inclination in the section of the positive inclination is 25%. In addition, Blade 3 has a shape where the length is 0.57, and the inclination is negative in the range of up to 0.17, and at the same time, a shape where the definite integrals in the ranges in which the inclination is negative and in which the inclination is positive are substantially equal.

As a result of sautéing onion by using these three types of blades, the onion pieces (i.e., cut onion) were not attached onto the parts in the vicinity of the root portion of the blade, and excellent sautéed onion was obtained, with the use of Blade 1. Further, although a small amount of the cut onion was sometimes attached in case of Blade 2, the once-attached onion was dropped by sliding of the onion, and long-time attachment of the onion did not occur.

On the other hand, in case of Blade 3, although the onion pieces were about to slide down along the surface of the blade and fall, the positive inclination near the end prevented falling, and the onion hence stayed without falling until the straight line connecting the root portion of the agitation blade and the central point of rotation became substantially vertical. Since the onion pieces tumbled down in the vicinity of the top of the pot and fell, a large amount of the onion pieces remained to be attached in the vicinity of the root portion of the agitation blade, and the prominent scorch was generated.

As to the onion sautéed by using these three types of blades, uniform and excellent sautéing was performed with the use of Blades 1 and 2, whereas strongly burned onion pieces were mixed in case of Blade 3, and the quality was greatly lowered due to the unfavorable burned taste.

Example 1

Sofrit

1) Skin-peeled raw ingredients for sofrit (16 kg of onion, 8 kg of carrot, and 8 kg of celery) were cut in such size that cubes having each side of 3 mm can be obtained, namely, a volume of one piece can be approximately 0.03 cm³.

2) A rotary sautéing machine (which was of a direct heating type having a heat transfer area of 0.6 m² and a pot volumetric capacity of 0.5 m³) according to the present invention described above was used as the sautéing machine. Thermal power was previously so adjusted that the inner pot surface temperature was maintained at 160 to 200° C., and the above-described sofrit raw ingredients (a total of 32 kg) and 3.2 kg of a salad oil were put into this rotary pot of the sautéing machine. Furthermore, the sautéing operation was carried out under the conditions of a heat quantity to be supplied of 75,000 kcal/h, a hot air temperature of 200° C., an airflow of 5 m³/min, and a number of revolutions of the pot of 8 to 10 rpm. It is to be noted that the put sofrit raw ingredients occupied approximately 14% of the pot volumetric capacity. In this case, the time required for the temperature at the center of the onion piece in the sofrit to reach 85° C. was approximately 10 minutes after putting the raw ingredients. After the temperature at the center of the onion piece reached 95° C., the sauténg processing was continuously carried out for approximately 30 minutes with the thermal power being adjusted so as to maintain the rotary pot inner surface temperature at 160 to 200° C. Meanwhile, the surface temperature of the onion pieces was 98 to 100° C. Furthermore, deglazing was effected by spraying water when 15 minutes passed after starting sautéing.

4) The sofrit manufactured as described above had a yield of approximately 50%, the tremendous sweet taste, the excellent caramel flavor and the good shape retention property. The pungent taste or the acrid taste was suppressed.

Example 2

Sautéed Onion

The same processing as in Example 1 was carried out to produce sautéed onion except that 32 kg of skin-peeled raw onions were taken instead of the skin-peeled raw sofrit ingredients (a total of 32 kg) and cut into each cube having a side length of 3 mm. In this case, the time required for the temperature at the center of the onion piece to reach 85° C. was approximately 10 minutes after putting the cut onion into the rotary pot.

Example 3

Pasta Sauce

Basic ingredients consisting of 40 parts by weight of the sofrit manufactured in Example 1, 20 parts by weight of minced meat, 20 parts by weight of a vegetable/fruit paste, 15 parts by weight of water, and 5 parts by weight of a powder ingredient consisting of salt, sugar and spices were put in a heating pot having an agitation function and boiled for approximately 40 minutes after reaching 95° C., thereby producing a liquid pasta sauce.

The pasta sauce manufactured in the above-described manner was poured on spaghetti and tasted. This pasta sauce had a definiteness and a high quality superior in the rich and thick taste.

[Effects of the Invention]

According to the present invention, it is possible to easily manufacture sautéed onion and sofrit which are superior in the sweet taste and the caramel flavor in particular, have the excellent shape retention property, and can greatly improve the flavor when used in Western-style foods such as a hamburger, a croquette, a sauce, a pasta sauce, soup, stew and the like, Japanese-style foods as well as Chinese-style foods.

What is claimed is:

1. A method for manufacturing sautéed onion or sofrit, comprising the steps of:

sautéing onion or sofrit ingredients in a rotary sautéing machine; and heating the machine with an auxiliary heater using overheated steam, steam, or hot air concurrently with the sautéing step;

whereby the temperature at a center of the onion or sofrit ingredients in a rotary pot of the rotary sautéing machine is increased to 85–95° C. within 10 minutes; and after the temperature at the center of the onion or sofrit ingredients reaches 95° C., deglazing is continuously carried out by spraying water, as required, while maintaining the surface temperature of the onion or sofrit ingredients at 95–102° C. for 15 to 120 minutes, thereby effecting sautéing processing.

2. A food product which is produced by using, as an ingredient material, the sautéed onion or sofrit obtained by a manufacturing method as set forth in claim 1.

3. The method for manufacturing sautéed onion or sofrit recite in claim 1, further comprising the step of oscillating the rotary sautéing machine concurrently with the sautéing step.

4. A food product which is produced by using, as an ingredient material, the sautéed onion or sofrit obtained by a manufacturing method as set forth in claim 3.

5. A method for manufacturing sautéed onion or sofrit, comprising the steps of:

sautéing cut onions or sofrit ingredients in a rotary sautéing machine; and oscillating the rotary sautéing machine concurrently with the sautéing step, whereby the temperature at a center of the onion or sofrit ingredients in a rotary pot of the rotary sautéing machine is increased to 85–95° C. within 10 minutes; and after the temperature at the center of the onion or sofrit ingredients reaches 95° C., deglazing is continuously carried out by spraying water, as required, while maintaining the surface temperature of the onion or sofrit ingredients at 95–102° C. for 15 to 120 minutes, thereby effecting sautéing processing.

6. A food product which is produced by using, as an ingredient material, the sautéed onion or sofrit obtained by a manufacturing method as set forth in claim 5.

* * * * *